May 8, 1951     J. E. SCOTT     2,552,385
FACE METER
Filed Jan. 15, 1949     2 Sheets-Sheet 1
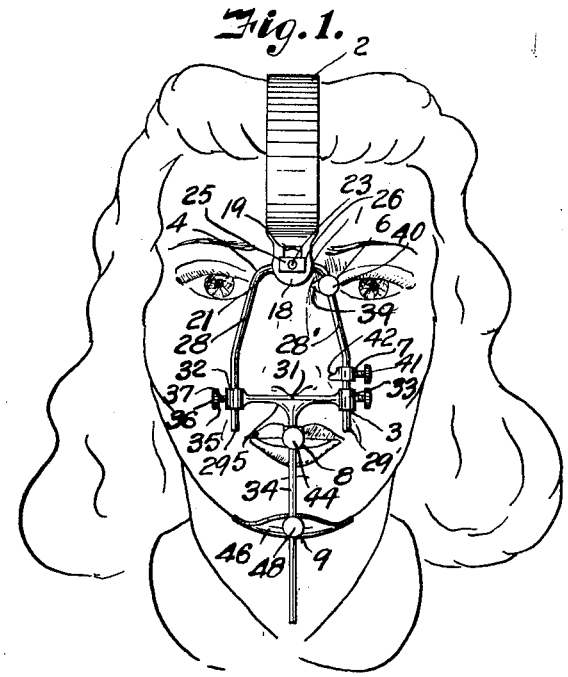
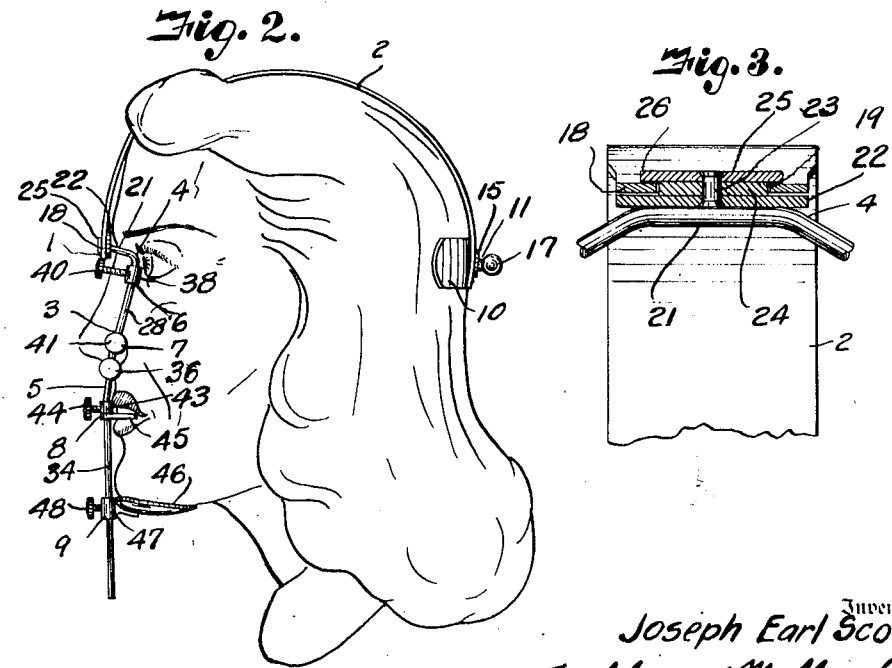
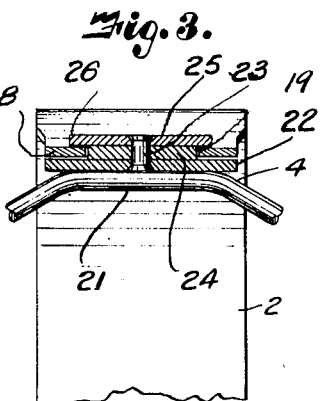
Inventor
Joseph Earl Scott
By Fishburn & Mullendore
Attorneys May 8, 1951 J. E. SCOTT 2,552,385
FACE METER
Filed Jan. 15, 1949 2 Sheets-Sheet 2
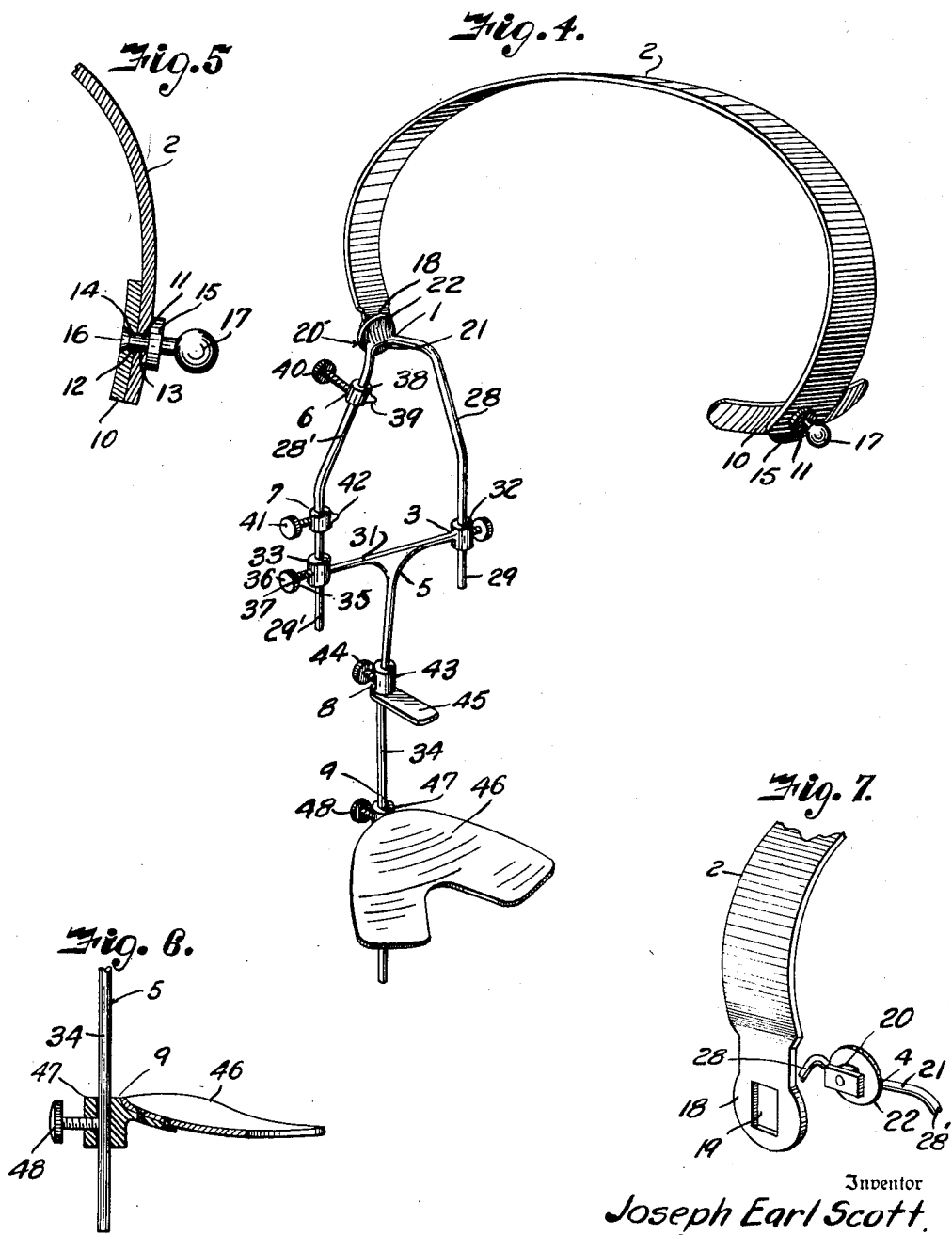
Inventor
Joseph Earl Scott
By Fishburn & Mullendore
Attorneys Patented May 8, 1951

2,552,385

UNITED STATES PATENT OFFICE 2,552,385

FACE METER

Joseph Earl Scott, Pratt, Kans.

Application January 15, 1949, Serial No. 71,154

4 Claims. (Cl. 33—174)

This invention relates to a face meter to be used in dental prosthesis for establishing vertical dimensions of a patient's face that existed prior to extraction of the teeth. For example, a prosthodontist is often called upon to fit dental plates in an edentulous mouth without any previous knowledge or data relating to the normal vertical dimension of the patient's face. Consequently, the prosthodontist must depend largely upon judgment in determining the facial dimensions with the end that the plates do not fit properly and change the patient's facial expression from that which existed prior to extraction.

It is, therefore, the principal object of the present invention to provide a face meter for accurately determining the normal vertical dimension of a patient's face through comparison of certain facial dimensions that do not change as a result of teeth extraction or facial movement.

Other objects of the invention are to provide for support of the face meter on the patient's head while the measurements are being taken so that the hands are free to make the necessary adjustments and to permit adjustments while the instrument is applied; and to provide a face meter that is of simple, light-weight construction to facilitate work of the prosthodontist and be comfortable to the patient.

In accomplishing these and other objects of the invention, I have provided improved structure, the preferred form of which is illustrated in the accompanying drawing wherein:

Fig. 1 is a front elevational view of a face meter constructed in accordance with the present invention and showing the application thereof to the face of a patient.

Fig. 2 is a side elevational view of the instrument as applied in Fig. 1.

Fig. 3 is a fragmentary section through the removable connection of the yoke bracket of the face frame with the head band of the instrument.

Fig. 4 is an enlarged perspective view of the face meter as viewed from the rear side.

Fig. 5 is an enlarged section through the rear end of the head band, particularly illustrating mounting of the stabilizing plate.

Fig. 6 is a vertical section through the chin plate particularly illustrating the adjustable mounting thereof on the stem bracket of the meter.

Fig. 7 is a perspective view showing the front end of the head band and the yoke bracket connector in detached spaced relation therewith.

Referring more in detail to the drawings:

1 designates a face meter constructed in accordance with the present invention for determining the vertical face dimension of a patient based upon dimensions between certain fixed points of the face, namely, the distance between the corner of the eye and the lip line in repose and the distance from the corner of the eye to the ala of the nose. I have found that these dimensions may be accurately determined because the location of the corner of the eye and ala of the nose do not change and that the normal lip line is clearly obvious when the lips are in repose. I have also determined that the sum of these dimensions equal the distance from the corner of the eye to the base of the chin when the lower jaw is in position to form the normal oral cavity.

In carrying out the invention, the face meter includes a support comprising a head band 2 carrying a face frame 3 including a yoke member 4 and a stem member 5 which adjustably mounts locating indicators 6, 7, 8 and 9 used in obtaining the normal face length of the patient. The yoke band 2 comprises a relatively thin, light-weight, preferably metal band of spring material and which is adapted to extend from the back of the head across the top and downwardly over the forehead to terminate near the level of the eyebrows, the band being of a size to lightly engage the forehead and back of the head without discomfort to the patient.

In order to stabilize the band and support the forward end in the vertical median line of the patient's face, the rear end of the band carries a transversely arranged stabilizing member 10 that is preferably arcuate to conform with the back of the head and which is secured to the free end of the band by a fastening device 11 having a stem 12 extending through registering openings 13 and 14 in the cross member and terminal end of the band respectively. The stem is provided with a collar 15 for engaging the head band and which cooperates with a peened over end 16 of the fastening device to secure the cross member. The stem projects rearwardly from the collar and terminates in a ball-like knob 17 which forms a finger grip to facilitate mounting of the band on the patient's head. The forward end of the band terminates in an ear 18 having a slot-like rectangular aperture 19 for mounting a connector 20 for the yoke member 4 of the frame 3. The yoke member 4 includes a cross bar portion 21 that is welded to a disk-shaped plate 22 that carries a spindle 23 which mounts a smaller disk 24 rotatable within the slot-like aperture 19. Also mounted on the spindle on the opposite side of the ear 18 is a cross plate 25 having a width and length to pass through the slot-like aperture when the cross bar of the yoke is turned parallel of the head band and which locks the yoke on the head band when the cross bar is turned transversely thereof with the ends 26 of the cross plate overlapping the sides of the slot-like aperture 19. The ends of the cross bar portion of the yoke member terminate slightly above the bridge of the nose in downwardly diverging arms 28—28' that are spaced apart a sufficient distance to freely accommodate the nose therebetween and terminate in parallel terminals 29 and 29' that extend downwardly alongside the ala of the nose, the diverging arms and terminals being of a length to extend from approximately the bridge of the nose to the mouth of the largest face with which the meter is likely to be used. The yoke member may be formed of any suitable material, for example, a wire stock, having a circular cross section.

The stem member 5 of the face frame includes a cross head 31 provided at the ends with transversely arranged tubular guides 32 and 33 which are slidably mounted on the parallel terminals of the yoke member. Depending from the center of the cross head is a stem 34 that extends a distance below the chin for mounting the indicators 9 and 8. The cross head of the stem member is adjustably retained in position on the parallel terminals of the yoke member by fastening devices such as set screws 35 having knurled heads 36 and threaded stems 37 mounted in threaded openings in the sleeve-like guides and adapted to engage the terminals 29 and 29'. The indicator 6 includes a guide sleeve 38 that is slidable on one of the diverging arms 28 or 28' and has a pointer 39 that is adapted to register with the corner of the eye opening. The indicator is retained in adjusted position by a similar set screw 40 that is threaded in the guide sleeve to frictionally engage the arm on which the member is mounted. The indicator 7 is of similar construction and is slidably mounted on one of the yoke terminals 29 or 29'. This member also includes a guide sleeve carrying a similar set screw 41 for engaging the yoke terminal and a pointer 42 that extends laterally to be registered with the ala of the nose.

The member 8 includes a guide sleeve 43 that is slidable on the stem 34 and carries a set screw 44 adapted to be tightened against the stem. Extending laterally from the guide sleeve 43 is a substantially flat tongue 45 adapted to be registered with the lip line.

The indicator 9 includes a chin plate 46 of substantially concavo-convex form with the concave side turned uppermost to accommodate the contour of the chin as shown in Fig. 2. The plate is carried by a guide sleeve 47 which is adapted to be retained in adjusted position on the rod by a set screw 48.

In using the instrument, the face frame is attached to the head band by passing the plate 25 through the rectangular aperture 19. The head band is then turned relatively to the face frame so as to bring the ends 25 in overlapping relation with the sides of the stop to lock the frame with respect to the head band. The chin plate indicator member 9 is moved downwardly on the stem 34 so that it is in an out-of-way position. The head band is then placed across the head of the patient as shown in Fig. 2 with the crossed member 10 extending across the back of the head to cooperate in supporting the face frame in perpendicular position with the nose of the patient extending through the yoke member of the frame. The indicator 6 is then adjusted along the arm 28' to register the pointer 39 in horizontal alignment with the corner of the eye. The indicator 7 is then adjusted on the terminal 29' to bring the pointer 42 in registry with the ala of the nose. When the lips of the patient are in repose the indicator 8 is adjusted so that the tongue 45 thereof is at the lip line. The distances are then taken between the pointers 39 and 42 and the pointer 39 and tongue 45. The results of the measurements are then added together, after which the indicator 9 carrying the chin plate is adjusted toward the pointer 39 until the space therebetween is equal to the sum of the previously obtained measurements. The thumb screw is then tightened to maintain the position of the chin plate. When the patient's chin is rested on the chin plate, the lower jaw is in position to form the normal oral cavity and by maintaining the adjustments, bite plates of proper height are made so that when fitted in the mouth, the patient's chin will be in position to engage the face plate.

It is obvious that the adjustments of the various indicators are easily made as the face frame is firmly supported by the head band and the adjustments are made directly with the frame member in position over the face.

It is also obvious that I have provided a simple, light-weight instrument for obtaining the desired data in such a manner that it is not disagreeable to the patient.

What I claim and desire to secure by Letters Patent is:

1. A device for determining normal vertical length of a patient's face after extraction of the teeth including a frame adapted to extend vertically of the face from above the corner of the eye to a point below the chin, a band adapted to extend over the head and having a front end terminating near the bridge of the nose and the other end at the back of the head, said frame including a yoke member having arms depending from said front end of the band and adapted to extend along sides of the nose, an indicator on one of said arms adapted to be registered with the corner of the eye, a second indicator on said arm adapted to be registered with the ala of the nose, a cross bar having ends adjustable on said arms between the nose and mouth and having a depending stem adapted to extend across the mouth to a point below the chin, an indicator adjustable on the stem for registry with the lip line, and a chin engaging member adjustable on the stem to engage under the chin.

2. A device for determining normal vertical length of a face after extraction of the teeth including a frame having an arm portion adapted to extend vertically of the face along one side of the nose of a patient from above the corner of the eye to a point below the nose, indicators movable on said arm to register with the corner of an eye and ala of the nose respectively, said frame including a part carried by said arm and adapted to depend across the lip line and below the chin, a lip line indicator on said part for indicating the lip line, and a chin engaging member movable on said part to a distance from the eye corner indicator equal to the combined distances of said eye corner indicator to each of other of said indicators.

3. A device for determining normal vertical length of a face after extraction of the teeth including a frame adapted to extend vertically of the face and comprising a yoke member having arms adapted to extend along sides of the nose, an indicator on one of said arms adapted to be registered with the corner of the eye, a second indicator on said arm adapted to be registered with the ala of the nose, a cross bar having ends adjustable on said arms between the nose and mouth and having a depending stem adapted to extend across the mouth to a point below the chin, an indicator adjustable on the stem for registry with the lip line, and a chin engaging member adjustable on the stem to engage under the chin.

4. A device for determining normal vertical length of a face after extraction of the teeth including a frame adapted to extend vertically of the face from above the corner of the eye to a point below the chin, a band adapted to extend over the head and having a front end terminating near the bridge of the nose and the other end at the back of the head, said frame including a yoke member having arms depending from said front end of the band and adapted to extend along sides of the nose, an indicator on one of said arms adapted to be registered with the corner of the eye, a second indicator on said arm adapted to be registered with the ala of the nose, a cross bar having ends adjustable on said arms between the nose and mouth and having a depending stem adapted to extend across the mouth to a point below the chin, an indicator adjustable on the stem and having a tongue for registry with the lip line, and a chin engaging member adjustable on the stem to engage under the chin.

JOSEPH EARL SCOTT.

REFERENCES CITED

The following references are of record in the file of this patent:

UNITED STATES PATENTS

| Number | Name | Date |
|---|---|---|
| 1,044,206 | Little | Nov. 12, 1912 |
| 1,976,045 | Sorenson | Oct. 9, 1934 |
| 2,048,989 | Baribeau | July 28, 1936 |
| 2,107,534 | Houser | Feb. 8, 1938 |

FOREIGN PATENTS

| Number | Country | Date |
|---|---|---|
| 373,854 | Great Britain | June 2, 1932 |